United States Patent

[11] 3,627,298

| [72] | Inventor | Jan Gaydecki<br>Leicester, England |
|---|---|---|
| [21] | Appl. No. | 10,568 |
| [22] | Filed | Feb. 11, 1970 |
| [45] | Patented | Dec. 14, 1971 |
| [73] | Assignee | The Dunlop Company Limited<br>London, England |
| [32] | Priority | Jan. 18, 1969 |
| [33] | | Great Britain |
| [31] | | 8662/69 |

[54] FLUID SPRINGS
5 Claims, 2 Drawing Figs.

[52] U.S. Cl. .................................... 267/118, 267/65
[51] Int. Cl. ..................................... F16f 5/00
[50] Field of Search .......................... 267/118, 65 R, 65 B, 121

[56] References Cited
UNITED STATES PATENTS

| 3,074,709 | 1/1963 | Ballard et al. | 267/65 B |
| 3,343,775 | 9/1967 | Stephenson | 267/65 |
| 3,438,309 | 4/1969 | Boileau | 267/65 |

*Primary Examiner*—James B. Marbert
*Attorney*—Jeffers and Young

ABSTRACT: A rolling diaphragm fluid spring comprising an annular cylinder in which an annular piston is arranged to operate against a flexible diaphragm, the diaphragm and cylinder together enclosing an annular fluidtight space so as to form a spring with an axial extending central throughway. The opposing walls of the cylinder and piston may be cylindrical to give a diaphragm effective area not dependent on the stroke of the piston or alternatively the opposing walls may diverge to give a stroke-variable diaphragm effective area, of which the following is a specification.

FLUID SPRINGS

This invention comprises improvements in fluid springs e.g. air spring, and concerns fluid springs of the rolling diaphragm type.

In this type of spring a piston operates in a cylinder against a flexible diaphragm, the diaphragm and the cylinder together enclosing a fluidtight space. The diaphragm rolls between opposing walls of the piston and cylinder during relative movements thereof such movements changing the volume of said fluidtight space.

The opposing walls may be cylindrical, whereby the effective area of the spring remains constant with deflection. In stroke-variable area springs the opposing walls are inclined one with respect to the other.

According to one aspect of the present invention, a rolling diaphragm fluid spring comprises an annular cylinder in which an annular piston is arranged to operate against a flexible diaphragm, the diaphragm and cylinder together enclosing an annular fluidtight space so as to form a spring with an axially extending central throughway.

Such constructions is particularly suitable for replacing a coil-spring suspension having a concentric telescopic damper. The damper remains located in the throughway of the fluid spring and no excessive modifications of the vehicle body are necessary.

The present invention will now be described with reference to FIGS. 1 and 2 of the accompanying drawings which show cross-sectional views of examples of air springs in accordance with the present invention.

Figure 1:
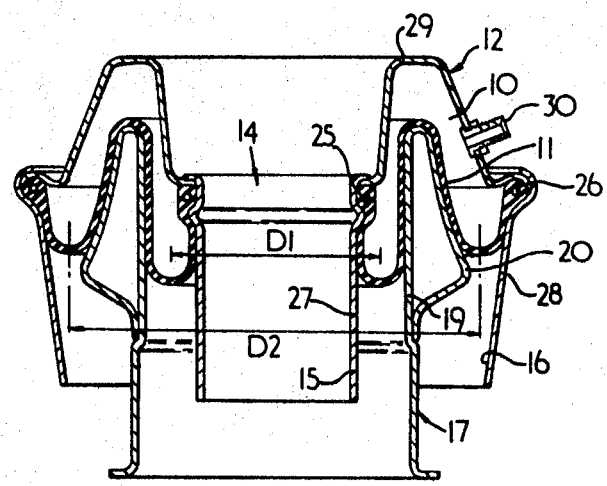

Referring to FIG. 1, the spring has an annular fluidtight space 10 defined between a rolling diaphragm 11 and a cylinder 12, the spring presenting a central throughway 14.

The cylinder 12 is of annular form having inner and outer walls 15, 16 and the piston 17 is likewise annular and has inner and outer walls 19, 20. The diaphragm rolls on the inner and outer walls 15, 16 and on the inner and outer walls 19, 20 during deflection of the spring. The opposing pairs of walls 15, 19 are cylindrical and the opposing pair of walls 16, 20 diverge so as to give a stroke-variable area spring the effective area of which increases with deflection.

The effective area of the diaphragm is that of a flat annular ring of the inner mean diameter $D_1$ and the outer mean diameter $D_2$. The effective load L due to an internal pressure P. in the space 10 is $L=(D_2^2-D_1^2)\pi/4$. A rising load/deflection characteristic is thus provided since $D_2$ increases with deflection.

The diaphragm has inner and outer beaded peripheral edges 25, 26 respectively, clamped between skirt portions 27 and 28 and cylinder head portion 29.

A pipeline connection 30 is provided on the cylinder head portion 29 communicating with the space 10. When employing this type of spring in a vehicle suspension the connection 30 is normally connected to a source of fluid pressure (not shown) which is controlled by a suspension levelling valve (not shown).

In vehicle suspension systems where a telescopic hydraulic damper is concentric with a coil spring it would not be possible to fit a conventional rolling diaphragm air spring unless an alternative position is found for the damper or an alternative means of damping is introduced. The air spring just described is suitable for such applications.

The hydraulic damper can operate freely in the throughway 14 without physical contact with the diaphragm. This is a distinct advantage because heat generated in the damper can dissipate freely.

Figure 2:
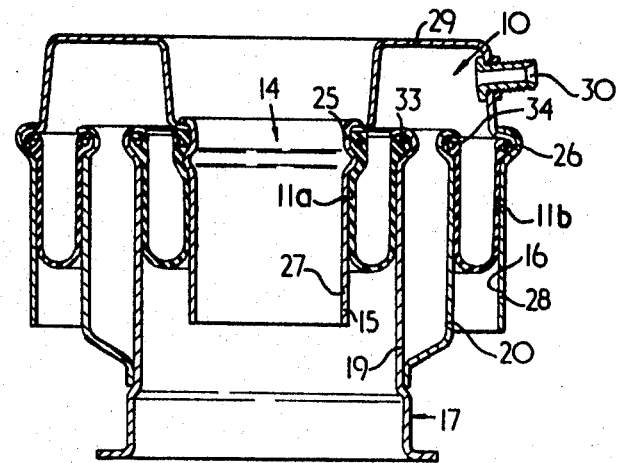

FIG. 2 illustrates a fluid spring similar to that shown in FIG. 1 and parts corresponding with parts already described with reference to FIG. 1 are indicated by the same reference numerals. The diaphragm is formed in two parts 11a and 11b the outer and inner peripheries of which are beaded and attached respectively to the inner and outer sides of the piston 17 as at 33 and 34. The opposing walls 15, 19 and 16, 20 are cylindrical in this construction and the effective area of the diaphragm accordingly remains constant with deflection.

Having now described my invention, what I claim is:

1. A rolling diaphragm fluid spring comprising an annular cylinder, an annular flexible diaphragm secured one at each of its peripheral edges to the respective cylinder ends whereby said diaphragm and cylinder together define and enclose an annular fluidtight space forming a spring with an axially extending central throughway, and an annular piston disposed to operate against said annular flexible diaphragm, and extending into said annular fluidtight space.

2. The fluid spring construction in accordance with claim 1 wherein said diaphragm is constructed of two annular portions, the larger diameter portion of said diaphragm being secured between the outer confronting surfaces of said piston and cylinder, and the smaller diameter portion being secured between the inner confronting surfaces of the piston and cylinder respectively.

3. The fluid spring construction in accordance with claim 1 wherein the confronting surfaces of the cylinder and piston respectively are cylindrical whereby the effective area of the diaphragm remains substantially constant throughout the stroke length of the piston.

4. A spring construction according to claim 1 wherein confronting walls of the cylinder and piston are divergent whereby the effective area of the diaphragm varies in accordance with the piston stroke.

5. The fluid spring construction in accordance with claim 1 wherein the edges of the said diaphragm are of enlarged cross section, and clamping means to secure said enlarged edges to the respective cylinder and piston.

* * * * *